United States Patent
Kuennen (10) Patent No.: US 9,884,280 B2
(45) Date of Patent: Feb. 6, 2018

(54) FILTER ELEMENT FOR SEPARATING PARTICLES FROM A PARTICLE-LADEN CRUDE GAS STREAM

(71) Applicant: Big Dutchman International GmbH, Vechta (DE)

(72) Inventor: Sven Kuennen, Holtinghausen (DE)

(73) Assignee: BIG DUTCHMAN INTERNATIONAL GmbH, Vechta (DE)

( * ) Notice: Subject to any disclaimer, the term of this patent is extended or adjusted under 35 U.S.C. 154(b) by 240 days.

(21) Appl. No.: 14/827,468

(22) Filed: Aug. 17, 2015

(65) Prior Publication Data

US 2016/0045847 A1 Feb. 18, 2016

(30) Foreign Application Priority Data

Aug. 18, 2014 (DE) .................... 20 2014 006 595 U (51) Int. Cl.
*B01D 45/08* (2006.01)
*B01D 45/06* (2006.01)
*B01D 46/00* (2006.01)

(52) U.S. Cl.
CPC ............. *B01D 45/08* (2013.01); *B01D 45/06* (2013.01); *B01D 46/0001* (2013.01)

(58) Field of Classification Search
CPC ..... B01D 45/06; B01D 45/08; B01D 46/0001
See application file for complete search history.

(56) References Cited

U.S. PATENT DOCUMENTS

| | | | |
|---|---|---|---|
| 2,228,320 | A | 1/1941 | Magruder, Jr. et al. |
| 2,636,371 | A | 4/1953 | Stephens |
| 3,013,667 | A | 12/1961 | Jackson et al. |

(Continued)

FOREIGN PATENT DOCUMENTS

| | | |
|---|---|---|
| DE | 171117 | 7/1905 |
| DE | 940440 | 3/1956 |

(Continued)

OTHER PUBLICATIONS

The Korean Intellectual Property Office, Notice of Reasons for Rejection for Appl Big Dutchman International GmbH, Korean Patent Appln No. 10-2012-70200074 (Aug. 29, 2014).

(Continued)

*Primary Examiner* — Robert Clemente
(74) *Attorney, Agent, or Firm* — Price Heneveld LLP (57) ABSTRACT

The invention relates to a filter element. A base carrier is configured as a folded plate, wherein first passage openings are arranged proximate first folding edges and first connection elements are arranged proximate second folding edges. Attachments are configured as strips foldable in a longitudinal direction along a fold line with second passage openings and a first and a second longitudinal edge. Second connection elements proximate the first and the second longitudinal edge of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges.

19 Claims, 10 Drawing Sheets

(56) References Cited

U.S. PATENT DOCUMENTS

| | | | |
|---|---|---|---|
| 3,075,337 A * | 1/1963 | Andreae | B01D 46/10 55/446 |
| 3,463,391 A | 8/1969 | Haegens | |
| 3,731,815 A | 5/1973 | Collingwood et al. | |
| 3,757,497 A | 9/1973 | Ray | |
| 3,907,967 A | 9/1975 | Filss | |
| 3,965,691 A | 6/1976 | Van Huis | |
| 4,031,180 A | 6/1977 | Bohanon | |
| 4,289,630 A | 9/1981 | Schmidt, Jr. et al. | |
| 4,389,352 A | 6/1983 | Bohanon, Sr. | |
| 4,482,367 A | 11/1984 | Howeth | |
| 4,499,031 A | 2/1985 | Sexton et al. | |
| 4,773,471 A | 9/1988 | Grant et al. | |
| 4,952,317 A | 8/1990 | Culkin | |
| 5,014,564 A | 5/1991 | Culkin | |
| 5,051,118 A | 9/1991 | Andreae | |
| 5,130,063 A | 7/1992 | Collins et al. | |
| 5,192,456 A | 3/1993 | Ishida et al. | |
| 5,336,131 A | 8/1994 | Crider et al. | |
| 5,492,082 A | 2/1996 | Krevinghaus et al. | |
| 5,505,852 A | 4/1996 | Van Rossen | |
| 5,692,386 A | 12/1997 | Casey, Sr. | |
| 5,966,953 A | 10/1999 | Murr et al. | |
| 5,971,370 A | 10/1999 | Galabinski | |
| 6,033,453 A | 3/2000 | Weddell, III | |
| 6,073,586 A | 6/2000 | Medlin et al. | |
| 6,079,365 A | 6/2000 | Medlin et al. | |
| 6,093,250 A | 7/2000 | Salazar et al. | |
| 6,290,635 B1 | 9/2001 | Demmel et al. | |
| 6,322,698 B1 | 11/2001 | Rios et al. | |
| 6,328,778 B1 | 12/2001 | Richerson et al. | |
| 6,533,253 B1 | 3/2003 | Calvert | |
| 6,585,793 B2 | 7/2003 | Richerson et al. | |
| 6,796,136 B1 | 9/2004 | Sullivan et al. | |
| 7,297,278 B2 | 11/2007 | Steele et al. | |
| 7,350,364 B2 | 4/2008 | Meerpohl | |
| 7,758,666 B2 | 6/2010 | Meerpohl | |
| 8,945,385 B2 | 2/2015 | Wesselman et al. | |
| 2002/0132960 A1 | 9/2002 | Haile et al. | |
| 2003/0001294 A1 | 1/2003 | Fermenter | |
| 2003/0047516 A1 | 3/2003 | Alviti | |
| 2004/0144110 A1 | 7/2004 | Reeves et al. | |
| 2005/0023219 A1 | 2/2005 | Kirker et al. | |
| 2006/0096259 A1 | 5/2006 | Meerpohl | |
| 2007/0017193 A1 | 1/2007 | Nishio et al. | |
| 2007/0163280 A1 | 7/2007 | Meerpohl | |
| 2011/0185897 A1 | 8/2011 | Wright et al. | |
| 2013/0193076 A1 | 8/2013 | Wesselmann et al. | |
| 2014/0080401 A1 | 3/2014 | Schwarz | |

FOREIGN PATENT DOCUMENTS

| | | |
|---|---|---|
| DE | 1293004 | 4/1969 |
| DE | 25 01 163 | 7/1976 |
| DE | 3124334 | 1/1983 |
| DE | 4127179 | 2/1993 |
| DE | 9217896 | 7/1993 |
| DE | 3879533 | 8/1993 |
| DE | 19634708 | 3/1998 |
| DE | 10208298 | 9/2003 |
| DE | 60013601 | 8/2005 |
| DE | 202010015385 | 2/2011 |
| DE | 202011000946 | 9/2011 |
| DE | 202010009560 | 12/2011 |
| DE | 102011107906 | 2/2012 |
| DE | 202011001810 | 6/2012 |
| DE | 202012010812 | 4/2013 |
| EP | 0285322 | 2/1982 |
| EP | 0100214 | 7/1982 |
| EP | 1344560 | 9/2003 |
| EP | 1655064 | 5/2006 |
| EP | 1655065 | 5/2006 |
| EP | 2361499 | 8/2011 |
| EP | 2384804 | 11/2011 |
| GB | 917669 | 6/1959 |
| GB | 1205895 | 2/1968 |
| JP | 2293013 | 12/1990 |
| JP | 9135648 | 5/1997 |
| JP | 2006218455 | 8/2008 |
| KR | 20030016721 | 3/2003 |
| WO | 9413387 | 6/1994 |
| WO | 9428997 | 12/1994 |
| WO | 2009017758 | 2/2009 |

OTHER PUBLICATIONS

New Logic, Research, Inc., http://vsep.com/pdf/VSEP_Brochure.pdf (2012).

State Intellectual Property Office of the People's Republic of China, Appln No. 201180009493.X, for Drive Device for a Membrane Filtration Arrangement (Dec. 4, 2013) (translated).

International Search Report, PCT/EP2011/050184 (Apr. 7, 2011).

German Patent Office, Search Report, Appln No. 20 2014 002 982.2, Big Dutchman International GmbH (Oct. 17, 2014) (German language only).

* cited by examiner

FILTER ELEMENT FOR SEPARATING PARTICLES FROM A PARTICLE-LADEN CRUDE GAS STREAM

CROSS-REFERENCE TO FOREIGN PRIORITY APPLICATION

The present application claims the benefit under 35 U.S.C. § 119(b) of German Application No. 202014006595.0, filed Aug. 18, 2014, entitled "Filter Element For Separating Particles From a Particle-Laden Crude Gas Stream."

FIELD OF THE INVENTION

The invention relates to a filter element for separating particles from a particle-laden rude gas stream. The invention relates further to a base carrier as well as an attachment for such a filter element. The invention relates further to a method for assembling such a filter element as well as a method for producing a base carrier and/or attachment for such a filter element.

BACKGROUND OF THE INVENTION

Filter elements of the above-mentioned type are also referred to as folded filters or regenerable filters and are known, for example, from EP 1 655 064 B1 or EP 2 384 804 B1. Such filter elements are used, in particular, in the area of agricultural enterprises, especially in the field of livestock husbandry, for cleaning the exhaust air from the operating facilities, such as stables. The exhaust air from the operating facilities of agricultural enterprises is regularly significantly dust-laden and, in addition, often contains animal excrements. This is why especially washable filter elements, which can be cleaned, are preferred. However, there is a demand for further improved filter elements, which are, in particular, robust and reliable, even under particularly demanding operating conditions, and which, furthermore, are cost-efficient with regard to their production, transport, assembly, and repair.

It is therefore the object of the present invention to provide a filter element which satisfies one or several of the above-mentioned demands.

SUMMARY OF THE INVENTION

Pursuant to the invention, this object is achieved through a filter element for separating particles from a particle-laden crude gas stream comprising at least one base carrier, configured as a folded plate with several first folding edges and several second folding edges, wherein several first passage openings are arranged in the area of the first folding edges and several first connection elements are arranged in the area of the second folding edges, and several attachments, wherein each attachment is configured as a strip foldable in longitudinal direction along a fold line with several second passage openings and a first and a second longitudinal edge, and wherein, furthermore, each attachment comprises second connection elements in the area of the first and the second longitudinal edge, wherein the attachments are respectively folded along their fold line and arranged on the base carrier in such a way that the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier.

The filter element pursuant to the invention comprises at least one base carrier and several attachments connected to the base carrier. Several first passage openings are provided for in the base carrier and several second passage openings are provided for in the attachments. The first and second passage openings are preferably arranged in the stream direction, offset from each other so that, due to the offset arrangement of the first and second passage openings, the particle-laden exhaust air, i.e. the crude gas stream, is diverted in an intermediate flow space between the base carrier and the several attachments and the particles in the crude gas stream with a higher density cannot follow this diversion process and, therefore, are collected in the intermediate flow space.

The base carrier is configured as a folded plate with several first and several second folding edges, alternating with each other. Side-walls are arranged between the folding edges, which, in the cross-section of the base carrier show a zigzagged arrangement, wherein the several first folding edges form the top of the peaks and the several second folding edges the bottom of the valleys of the zigzag pattern. Preferably, the base carrier is form stable, that is, when the base carrier is subjected to the intended stress during transport, assembly, operation, cleaning, maintenance, and/or disassembly, the base carrier essentially maintains its shape.

Several attachments are arranged on the at least one base carrier. The attachments are arranged as foldable strips, which are arranged on the base carrier folded along their fold lines. In folded condition, the attachments have an essentially V-shaped cross-section. A fold line can also be referred to as a line-shaped folding area.

Preferably, the folded attachments are arranged on the base carrier in such a way that the first and the second longitudinal edges of an attachment are connected with the first connection elements of the base carrier in the area of two adjacent second folding edges of the base carrier by means of the second connection elements arranged at them, with the attachments preferably being arranged in such a way that in each case the fold line of an attachment is parallel, but at a distance to, respectively, one first folding edge of the base carrier.

Preferably, an intermediate flow space is formed between the base carrier and the several attachments. As a general rule, the base carrier forms the inflow side of the filter element and the several attachments the outflow side.

The several first passage openings are arranged at a distance from each other, preferably equidistantly. The several second passage openings are also arranged at a distance from each other, preferably equidistantly. The first connection elements of the base carrier are also arranged at a distance from each other, preferably equidistantly, just as, preferably, the second connection elements of the first and second longitudinal edge of the attachments are arranged at a distance from each other, preferably equidistantly.

The arrangement of the first passage openings in the area of the first folding edges of the base carrier, of the connection elements in the area of the second folding edges of the base carrier and the arrangement of the second connection elements in the area of the first and second longitudinal edges of the attachments means that the passage openings or respectively the connection elements are arranged in the vicinity of the folding edges or respectively the longitudinal edges.

The first passage openings in the area of the first folding edges may, for example, partially extend over the two side-walls of the base carrier adjacent to a first folding edge so that, in the area of a first passage opening, the first folding edge is interrupted. It is preferable that the first passage openings have a round or oval shape and be arranged centrally to respectively one first folding edge. Alternatively, the first passage openings may also be arranged non-centrically to, respectively, one first folding edge. Preferably, the first passage openings extend over an area of less than 50%, in particular less than 30%, preferably less than 20%, of the extension of a side-wall.

Preferably, the first connection elements are arranged closely to the second folding edges of the base carrier, in particular in the halves adjacent to the second folding edges, in particular in the thirds or quarters of the side-walls of the base carrier that are adjacent to the second folding edges.

The second connection elements of the attachments are preferably arranged at less than 25% of the extension of the attachment transversely to the two longitudinal edges at a distance of the two longitudinal edges.

The several attachments arranged on the base carrier are positioned in such a way that respectively one first and one second longitudinal edge of two adjacent attachments are both located in the area of one single or respectively one shared second folding edge of the base carrier. Thus, the two adjacent attachments touch each other with their, respectively, first or second longitudinal edge and also touch a shared or respectively a single second folding edge of the base carrier. Likewise, preferably, a first and a second longitudinal edge of two adjacent attachments are respectively arranged in each one of the second folding edges of the base carrier. It is only in the second folding edges of the base carrier located at its longitudinal edges and respectively bordering the base carrier or respectively the filter element on the side that preferably only one longitudinal edge of the last attachment on the respective side is arranged.

Preferably, a filter element may also comprise several base carriers, the base areas of which are preferably shaped essentially square or rectangular and the longitudinal or transverse sides of which may be arranged adjacently to a larger rectangle or square. It is especially preferable that, in their longitudinal direction, the several attachments extend over two or several base carriers and, thus, be able to connect the latter with each other.

The filter element pursuant to the invention has various advantages. The configuration with at least one, preferably form stable, base carrier, and several attachments configured as strips foldable along a fold line makes it, for example, possible to transport the components of the filter element in a space-saving manner and to only assemble the filter element at the place of operation. For example, several base carriers can be stacked onto each other and, likewise, several attachments, preferably in unfolded condition, can be stacked onto each other. A multitude of base carriers and a multitude of attachments can thus respectively be transported in a space-saving and, therefore, cost-efficient manner. Furthermore, the configuration of the filter element pursuant to the invention makes it possible to adapt the size or respectively the dimensions of the filter element to the requirements of the installation situation by making it possible to use the number of used base carriers and suitable number of attachments in order to form a filter element.

In an especially preferable embodiment, the base carrier is designed as an injection molded part. The production of the base carrier by means of injection molding has, inter alia, the advantage that this way a form stable base carrier, which is, at the same time, robust and, in particular, liquid- and waterproof and, therefore, washable, can be produced in a simple and cost-efficient manner.

Furthermore, it is preferable that the attachments be designed as extrusion parts. The production of the attachments by means of extrusion also has the advantage that they can be produced in a cost-efficient and simple manner and that the attachments are also robust and liquid- or waterproof and, therefore, washable.

Preferably, the fold lines of the attachments are respectively configured as living hinges. It is furthermore preferable that the fold line of an attachment extend in the or transversely to the extrusion direction. The fold line can, for example, be configured as a perforation and be created by means of stamping. The fold line can consist of a different material than the other part of the attachment. Alternatively or in addition, the material in the area of the fold line can also be thinner than in the other part of the attachment.

Furthermore, it is, in particular, preferable that the base carrier and/or the attachments consist of plastic or comprise plastic. It is especially preferable that the base carrier consist of polypropylene copolymer (PP-C) or comprise polypropylene copolymer (PP-C) and/or that the attachments consist of polyvinyl chloride (PVC) or comprise polyvinyl chloride (PVC). These materials have proven to be particularly suitable for meeting the stringent requirements, especially in the area of livestock husbandry, in the long run.

Another preferred embodiment requires that the longitudinal extension of the attachments correspond to a, preferably integer, multiple of the extension of the at least one base carrier in the direction of its folding edges.

If, for example, the longitudinal extension of the attachments equals twice the extension of a base carrier in the direction of its folding edges, two base carriers, which are consecutively arranged in the direction of their folding edges, can be connected by means of a connection with an attachment, since the one attachment extends over the two consecutively arranged base carriers. Since several attachments are arranged on one base carrier, this means that these several attachments also connect the two base carriers so that the two base carriers are connected through the shared attachments. Thus, different sizes of filter elements can be quickly and easily realized.

Furthermore, it is especially preferred that the connection between the first and the second connection elements be configured as a detachable connection. The connection between the first and the second connection elements can, for example, be designed as a locking or snap-on connection.

A detachable connection between the first and the second connection elements has, inter alia, the advantage that, for example, damaged base carriers or attachments can be easily and individually replaced without requiring the replacement of the entire filter element.

In another embodiment it is preferred that the base carrier comprise two opposing longitudinal edges extending parallel to the folding edges, wherein both longitudinal edges respectively form sections of second folding edges, wherein preferably the sections of the second folding edge of the first longitudinal edge and the sections of the second folding edge of the second longitudinal edge are free of overlaps in the direction of the folding edges. In this case, it is especially preferable that the sections of one longitudinal edge of a first base carrier form a shared second folding edge with the sections of the other longitudinal edge of a second, adjacent base carrier.

Such a configuration has the advantage that several base carriers can be arranged next to each other in orthogonal direction to their folding edges without the creation of a gap or a distance between the base carriers. Furthermore, this configuration has the advantage that, when two base carriers arranged next to each other are connected with the attachments through the shared second folding edge, the two base carriers arranged next to each other are also connected with each other. To this end, it is especially preferable that the sections of the second folding edge of the first longitudinal edge of a first base carrier and the sections of the second folding edge of the second longitudinal edge of an adjacent base carrier comprise at least one first connection element, respectively.

In another preferred embodiment it is required that the second passage openings be arranged between the respectively first longitudinal edge and the respective fold line of the attachments or between the respectively second longitudinal edge and the respective fold line of the attachments.

With regard to the longitudinal direction of the attachments, it is thus preferable that the second passage openings be located in the right or the left half of an attachment. Such an asymmetrical arrangement of the second passage openings in relation to the longitudinal axis of the attachments makes it possible in a particularly simple manner to arrange the second passage openings offset from the first passage openings of the base carrier and, thus, to provide for an especially effective particle separation.

In another preferred embodiment, it is required that the first connection elements be configured as preferably essentially horizontal, protrusions. Furthermore, it is preferable that the second connection elements be configured as passage openings.

These configurations constitute an especially preferred version of the connection between the attachments and the at least one base carrier, since this is a simple and, preferably, and especially, detachable connection.

Furthermore, an embodiment of the filter element is preferred which is characterized in that the first connection elements are configured as connection element pairs, wherein, respectively, one pair of first connection elements is arranged in a slightly offset manner, opposite to each other, in the area of one of the second folding edges, preferably along the extension direction of the second folding edges. Furthermore, it is preferred that the second connection elements are configured as connection element pairs, wherein respectively one pair of second connection elements of the first and second longitudinal edges is arranged in a slightly offset manner, opposite to each other, preferably along the extension direction of the folding edges.

Such a configuration of the first and the second connection elements as connection element pairs will be, in particular, preferable, if they are configured in such a way that, respectively, a first and a second connection element meet in a fitting manner in order to be able to interlock.

In an especially preferred embodiment it is further required that the second folding edges of the base carrier respectively comprise three pairs of first connection elements, wherein preferably two pairs be arranged in the area of the edges of the base carrier extending transversely to the first and the second folding edges and the third pair be arranged centrally between the other two pairs. Preferably, it is further required that each attachment comprise twelve pairs of second connection elements, wherein, preferably, the third and the fourth pair, the sixth and the seventh pair and the ninth and the tenth pair be located at a shorter distance from each other than the other (adjacent) pairs. Such an arrangement of the pairs of first and second connection elements will be particularly preferable if the attachments have a longitudinal extension corresponding to four times the extension of the at least one base carrier in the direction of its folding edges.

Pursuant to another aspect of the invention, the object mentioned above is achieved through a base carrier for a previously described filter element for separating particles from a particle-laden crude gas stream, wherein the base carrier is configured as a folded plate with several first folding edges and several second folding edges, wherein several first passage openings are arranged in the area of the first folding edges and several first connection elements are arranged in the area of the second folding edges.

Furthermore, pursuant to another aspect of the invention, the above mentioned object is achieved through an attachment for the previously described filter element for separating particles from a particle-laden crude gas stream, wherein the attachment is configured as a strip foldable in longitudinal direction along a fold line comprising several second passage openings and a first and a second longitudinal edge, and wherein, furthermore, each attachment comprises second connection elements in the area of the first and the second longitudinal edge.

The base carrier pursuant to the invention and the attachment pursuant to the invention and their respectively possible embodiments comprise features which make them, in particular, suitable for being used for a filter element pursuant to the invention and its embodiments. Regarding the advantages, possible versions, and realization details of these further aspects of the invention and its embodiments, reference is made to the previous description of the respective features of the filter element.

Pursuant to another aspect of the invention, the object mentioned above is also achieved through a method for assembling a previously described filter element for separating particles from a particle-laden crude gas stream, comprising: providing of at least one base carrier, configured as a folded plate with several first folding edges and several second folding edges, wherein several first passage openings are arranged in the area of the first folding edges and several first connection elements are arranged in the area of the second folding edges, providing of several attachments, wherein each attachment is configured as a strip foldable in longitudinal direction along a fold line with several second passage openings and a first and a second longitudinal edge, and wherein, furthermore, each attachment comprises second connection elements in the area of the first and the second longitudinal edge, folding of the attachments, respectively along their fold line, arranging the attachments on the base carrier in such a way that the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier.

Furthermore, pursuant to another aspect of the invention, the object mentioned above is also achieved through a method for producing a base carrier and/or an attachment for a previously described filter element for separating particles from a particle-laden crude gas stream, comprising injection molding, preferably from plastic, of a base carrier, being configured as a folded plate with several first folding edges and several second folding edges, wherein several first passage openings are arranged in the area of the first folding edges and several first connection elements are arranged in the area of the second folding edges, and/or extruding an attachment, wherein the attachment is configured as a strip foldable in longitudinal direction along a fold line with several second passage openings and a first and a second longitudinal edge, and wherein, furthermore, the attachment comprises second connection elements in the area of the first and the second longitudinal edge.

Preferably, the production method is further developed through the fact that the fold line of the attachment extends in the or transversely to the extrusion direction.

Another preferred realization of the method is achieved through the fact that the fold line of the attachment is better formable than the other area of the attachment and that the improvement of the formability is achieved through a section-by-section reduction of the wall thickness, preferably by means of a chipless forming process.

BRIEF DESCRIPTION OF THE DRAWINGS

One preferred embodiment of the invention is, by way of example, described by means of the attached figures. The following is shown in FIG. 1 is a top view of a base carrier of an exemplary embodiment of a filter element.

DETAILED DESCRIPTION OF THE PREFERRED EMBODIMENTS

Figure 1:
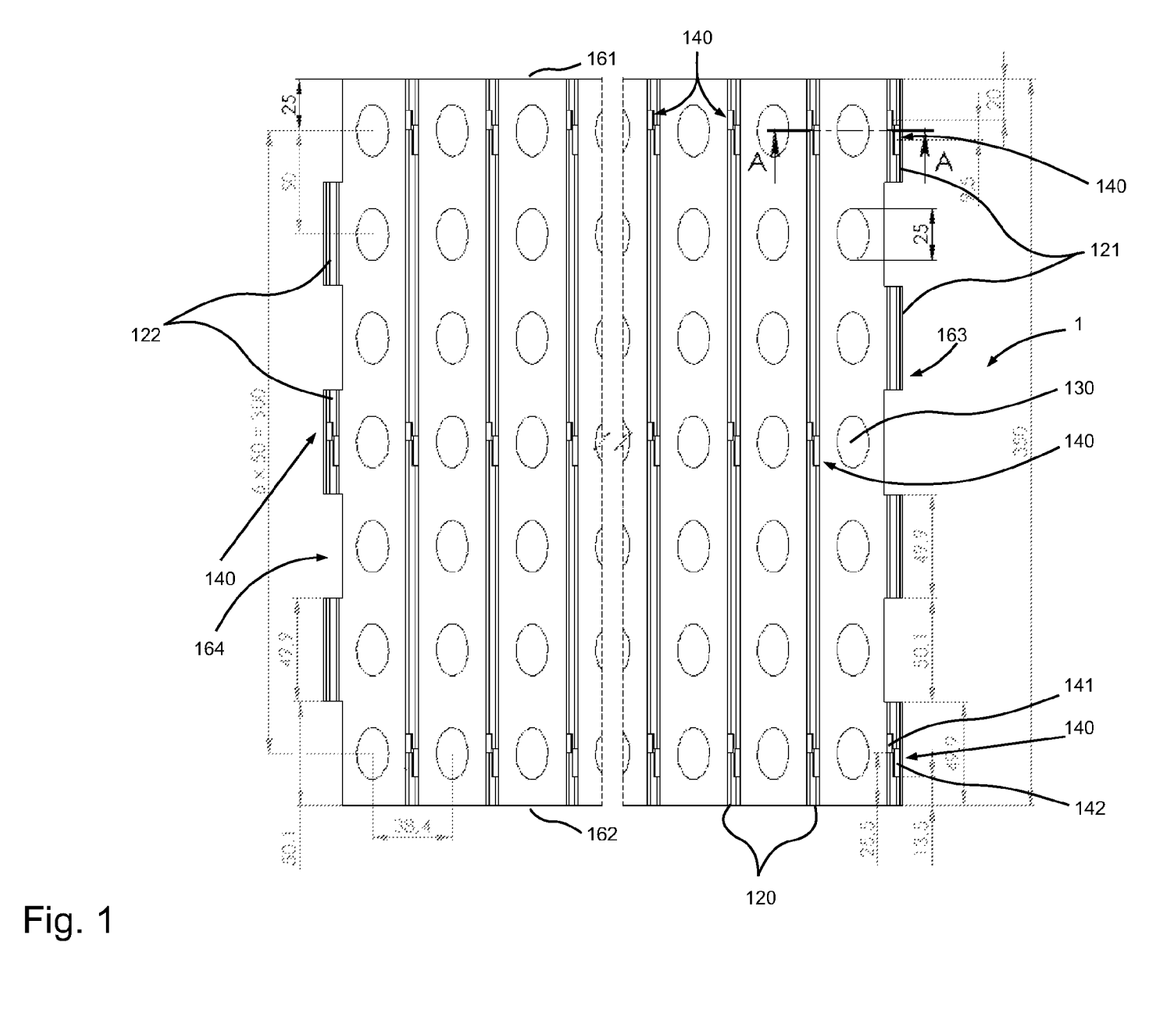
Figure 2:
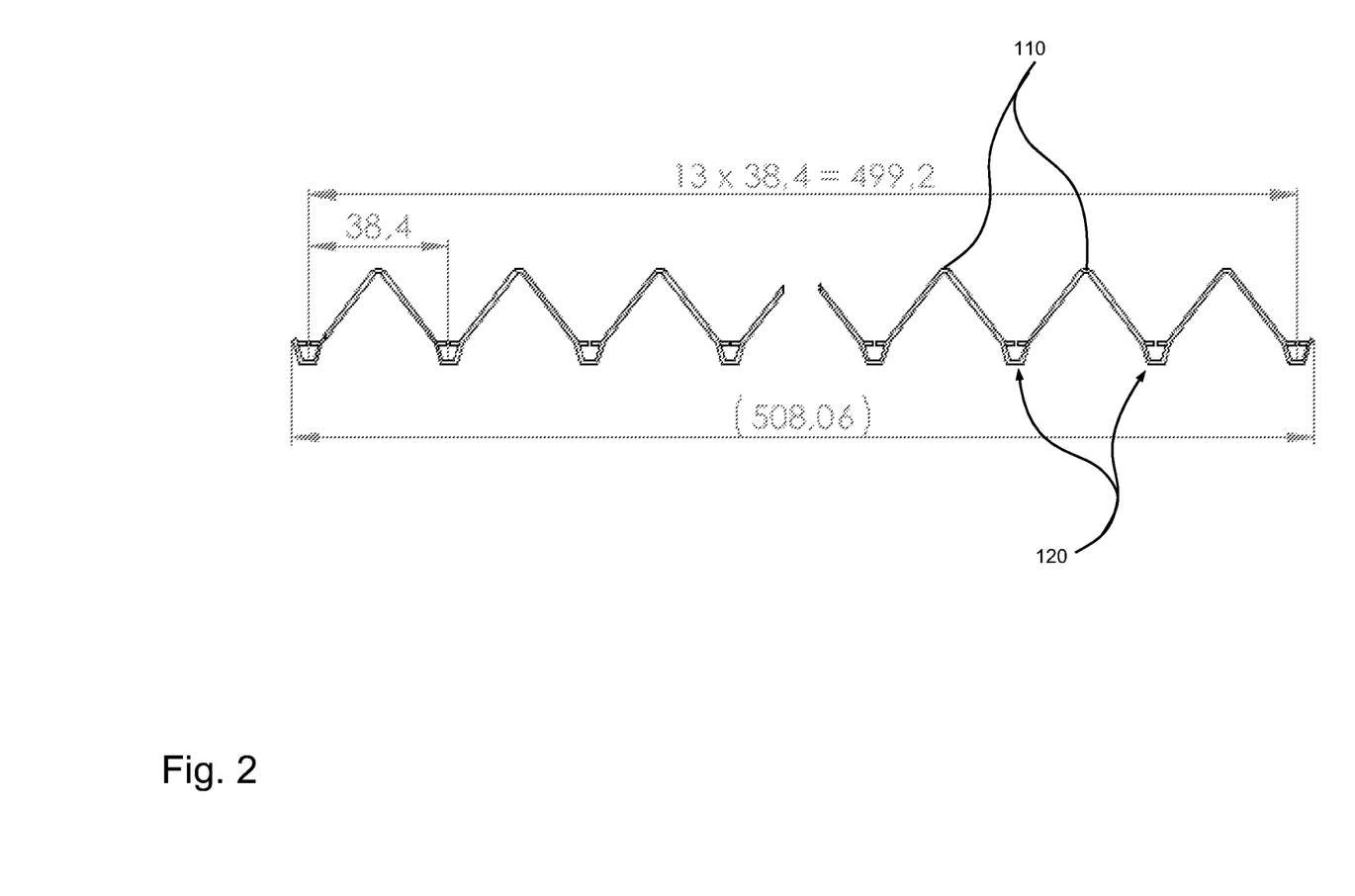
FIG. 2 is a lateral view in the direction of the folding edges of the base carrier pursuant to FIG. 1.
Figure 3:
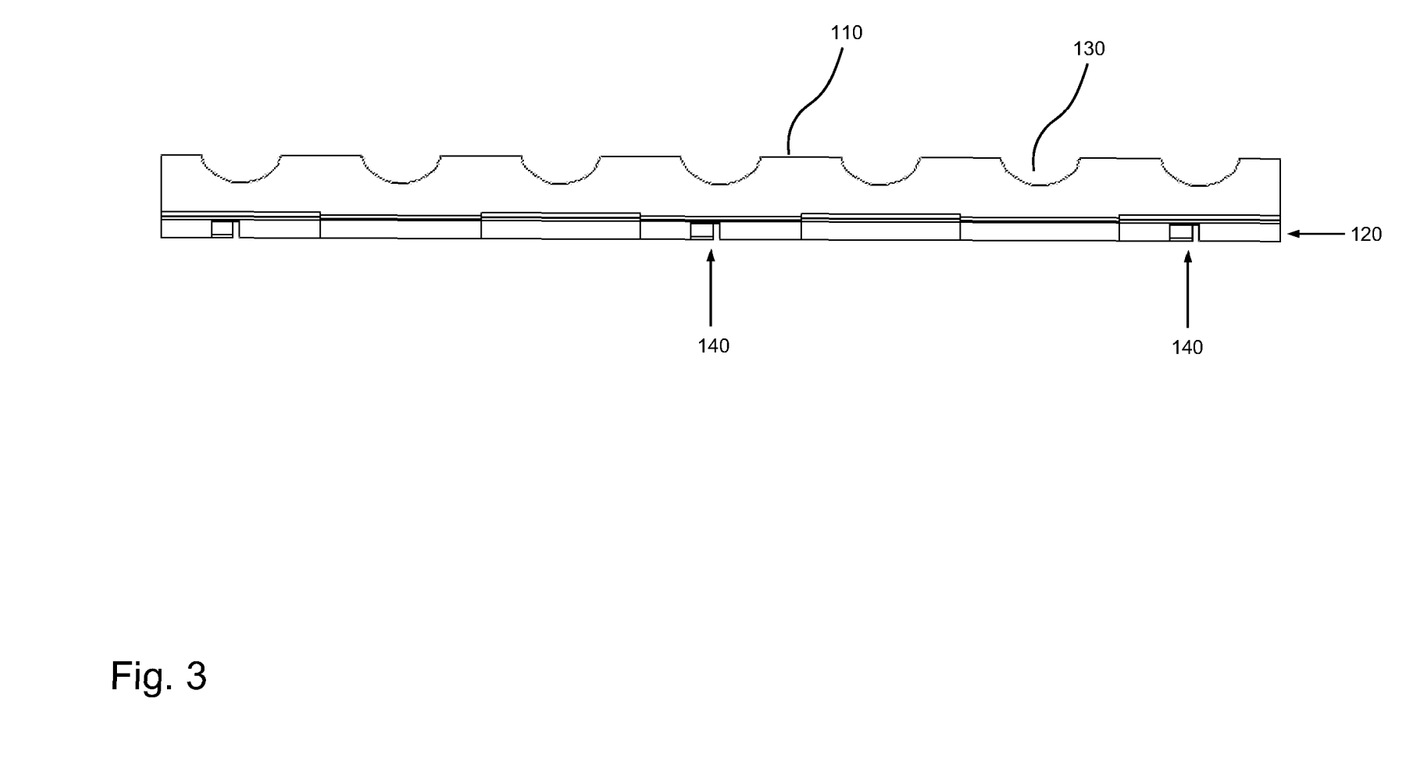
FIG. 3 is a lateral view in the orthogonal direction to the folding edges of the base carrier pursuant to FIG. 1.
Figure 4:
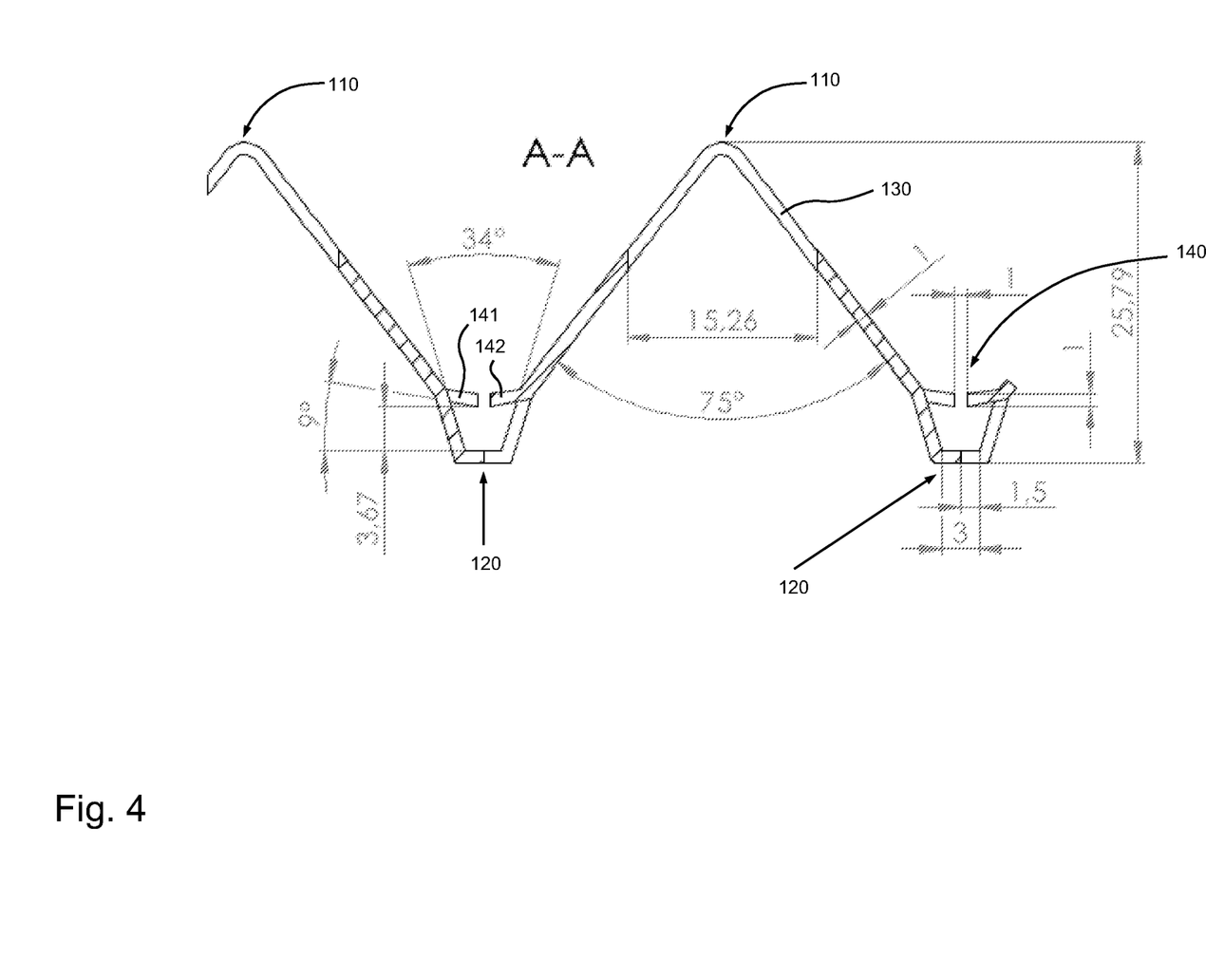
FIG. 4 is a cross-section pursuant to the intersecting line A-A from FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1 to 5 show a base carrier 1 and FIGS. 6 to 10 an attachment 2 for an exemplary embodiment of the filter element pursuant to the invention. The dimensions of the base carrier 1 shown in FIGS. 1 to 5 and of the attachment 2 shown in FIGS. 6 to 10 are chosen in such a way that the longitudinal extension of the attachment 2 equals four times the extension of the base carrier 1 in the direction of its folding edges 110, 120. Thus, when assembled, an exemplary filter element will preferably comprise four base carriers 1, which, in the direction of their folding edges 110, 120 are consecutively arranged and connected by a multitude of attachments 2 so that each one of the attachments 2 spans over the four consecutively arranged base carriers 1.

The base carrier 1 is configured as a folded plate and made of plastic, preferably polypropylene copolymer (PP-C), by means of injection molding. The base carrier 1 is form stable and essentially maintains its form under stress occurring during intended transport and use without deforming significantly. The base carrier 1 comprises several first folding edges 110 and several second folding edges 120. Several passage openings 130 are arranged in the area of the first folding edges 110. The passage openings 130 are arranged centrally above the first folding edges 110 and at equal distances from each other.

Several first connection elements 140 are arranged in the area of the second folding edges 120. The first connection elements 140 are configured as connection element pairs 141, 142 in the area of the second folding edges 120, wherein, respectively, one pair 141, 142 of first connection elements 140 is arranged in a slightly offset manner, opposite to each other, along the extension direction of the second folding edge. Furthermore, the first connection elements 140 are essentially configured as horizontal protrusions 141, 142. As can be seen in FIG. 1, in particular, the base carrier 1, respectively, comprises three pairs 141, 142 of first connection elements 140, wherein two of the pairs 141, 142 are arranged in the area of the edges 161, 162 of the base carrier 1 that extend transversely to the first and the second folding edges 110, 120 and the third pair is arranged centrally between the two other pairs.

Figure 5:
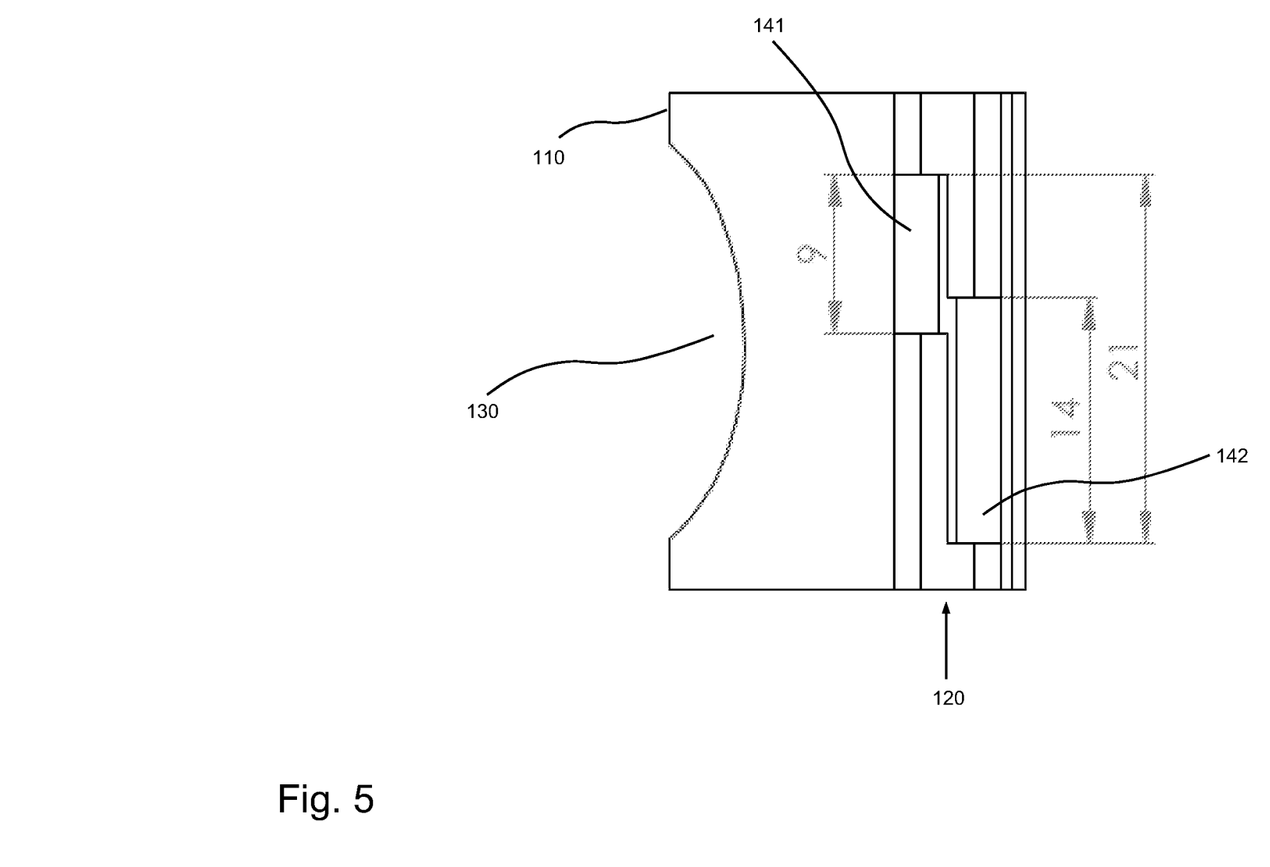
FIG. 5 is a magnified section of FIG. 1.

As can be seen in FIG. 5, in particular, the two essentially horizontal protrusions 141, 142 are arranged offset from each other in the extension direction of the second folding edge 120. Furthermore, the essentially horizontal protrusions 141, 142 are configured in such a way that they comprise different longitudinal extensions in the extension direction of the second folding edge 120. In the exemplary embodiment shown in the Figures, the protrusion 141 is shorter than the protrusion 142, wherein there is a small overlapping area in the longitudinal direction of the second folding edge 120.

Furthermore, the base carrier comprises two opposing longitudinal edges 163, 164 extending parallel to the folding edges 110, 120, wherein the two longitudinal edges 163, 164 respectively form sections 121, 122 of second folding edges 120. In the direction of the folding edges 120, the sections 121 of the second folding edge 120 of the first longitudinal edge 163 and the sections 122 of the second folding edge 120 of the second longitudinal edge 164 are free of overlaps. Thus, it is made possible that the sections 121 of the first longitudinal edge 163 of a first base carrier 1 form a shared second folding edge 120 with the sections 122 of the other longitudinal edge 164 of a second, adjacent base carrier. Four sections 121 are formed at the first longitudinal edge 163, the two outer sections of which, which are adjacent to the transversal edges 161, 162, respectively comprise a pair of first connection elements 140. Three sections 122 are formed at the second longitudinal edge 164, the center section of which comprises a pair of first connection elements 140.

Figure 6:
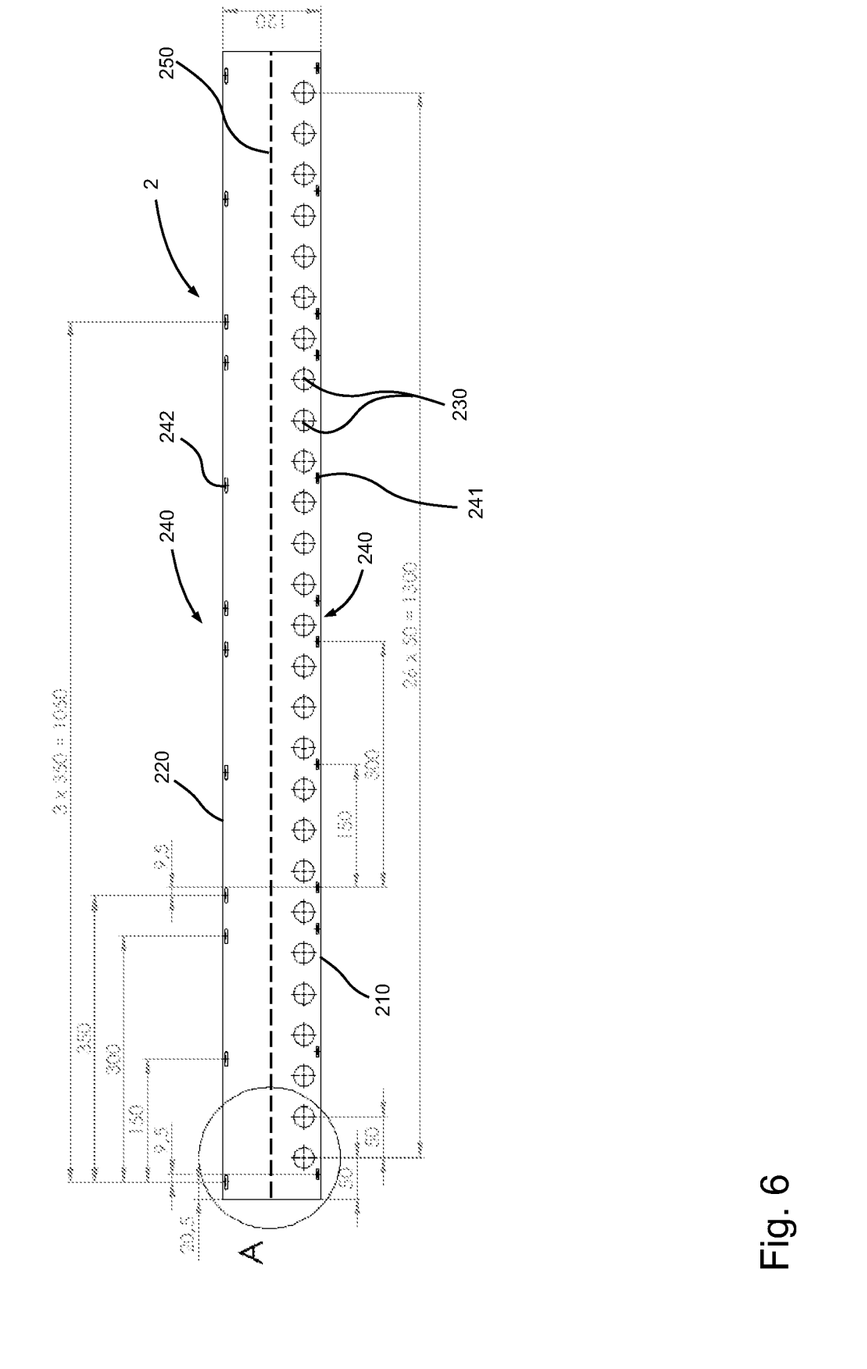
FIG. 6 is a top view of an attachment for an exemplary embodiment of a filter element with at least one base carrier pursuant to FIG. 1.
Figure 7:
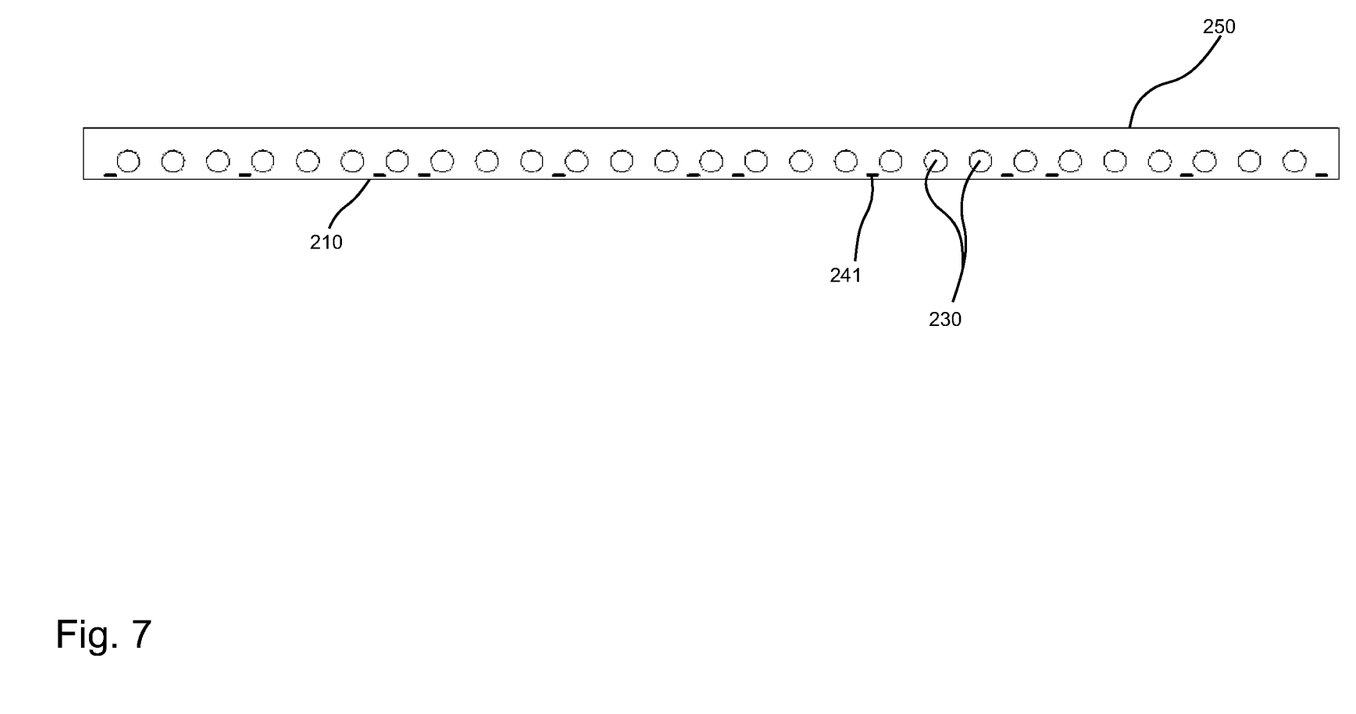
FIG. 7 is a lateral view of the attachment pursuant to FIG. 6 in a folded condition.
Figure 8:
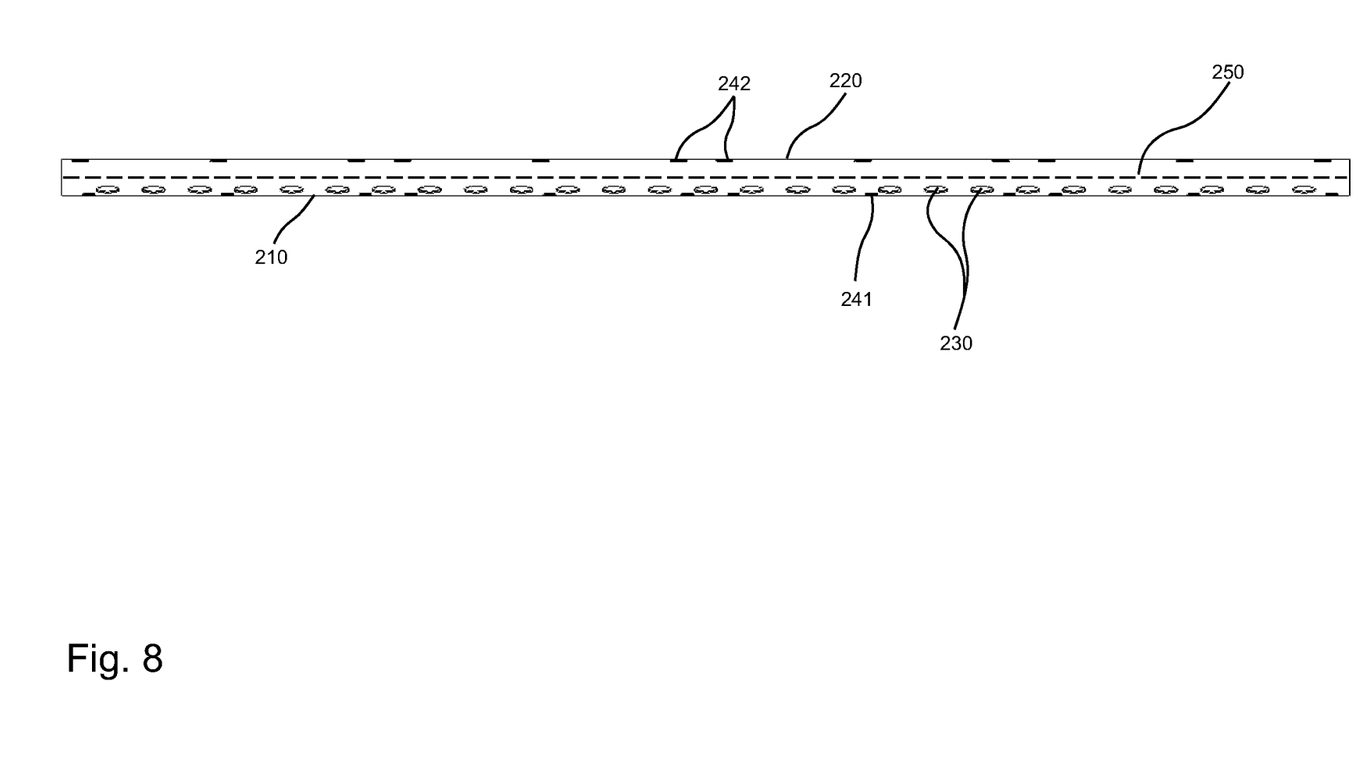
FIG. 8 a top view of the attachment pursuant to FIG. 6 in a folded condition.
Figure 9:
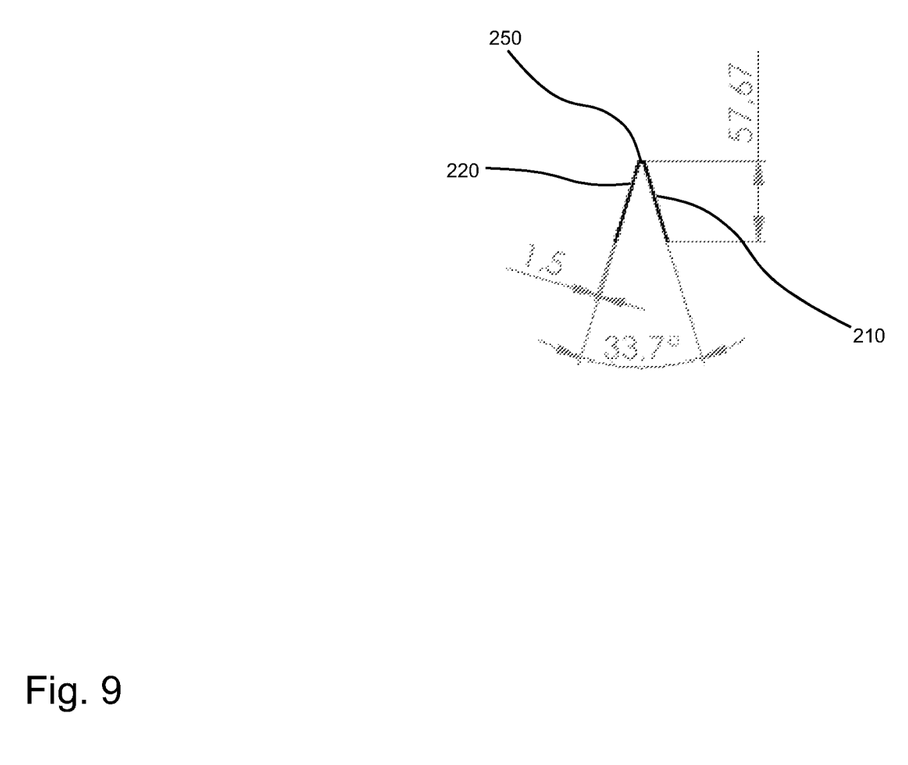
FIG. 9 is a cross-section of the attachment pursuant to FIG. 6 in a folded condition.

The attachment 2 is made of plastic, in particular of PVC, by means of extrusion and configured as a strip foldable in longitudinal direction along a fold line 250. The attachment 2 comprises several passage openings 230, which, in the longitudinal direction of the attachment 2, are arranged at an equal distance from each other. The attachment 2 comprises a first and a second longitudinal edge 210, 220, in the area of which the second connection elements 240 are arranged.

Several attachments 2 are preferably transported in unfolded condition and stacked onto each other, and only folded on-site along the fold line 250, which is preferably configured as a living hinge, and attached onto the base carrier 1. The second passage openings 230 are arranged between the first longitudinal edge 210 and the folding edge 250 of the attachment 2.

Since the first passage openings 130 are arranged centrically to the first folding edges 110 of the base carrier 1 and the second passage openings 230 are arranged between the first longitudinal edges 210 and the fold line 250 of the attachment 2, an offset arrangement of the first passage openings 130 in relation to the second passage openings 230 occurs when the filter element is assembled so that, when flowing through the filter element, the exhaust air must change direction in order to first flow through the first passage openings 130 and then through the second passage openings 230, and so that, due to gravity, particles, in particular larger particles, are not able to perform this change of direction or are not able to perform it sufficiently, and, thus, remain in an interim flow space between the base carrier and the attachments and are separated from the exhaust air.

Figure 10:
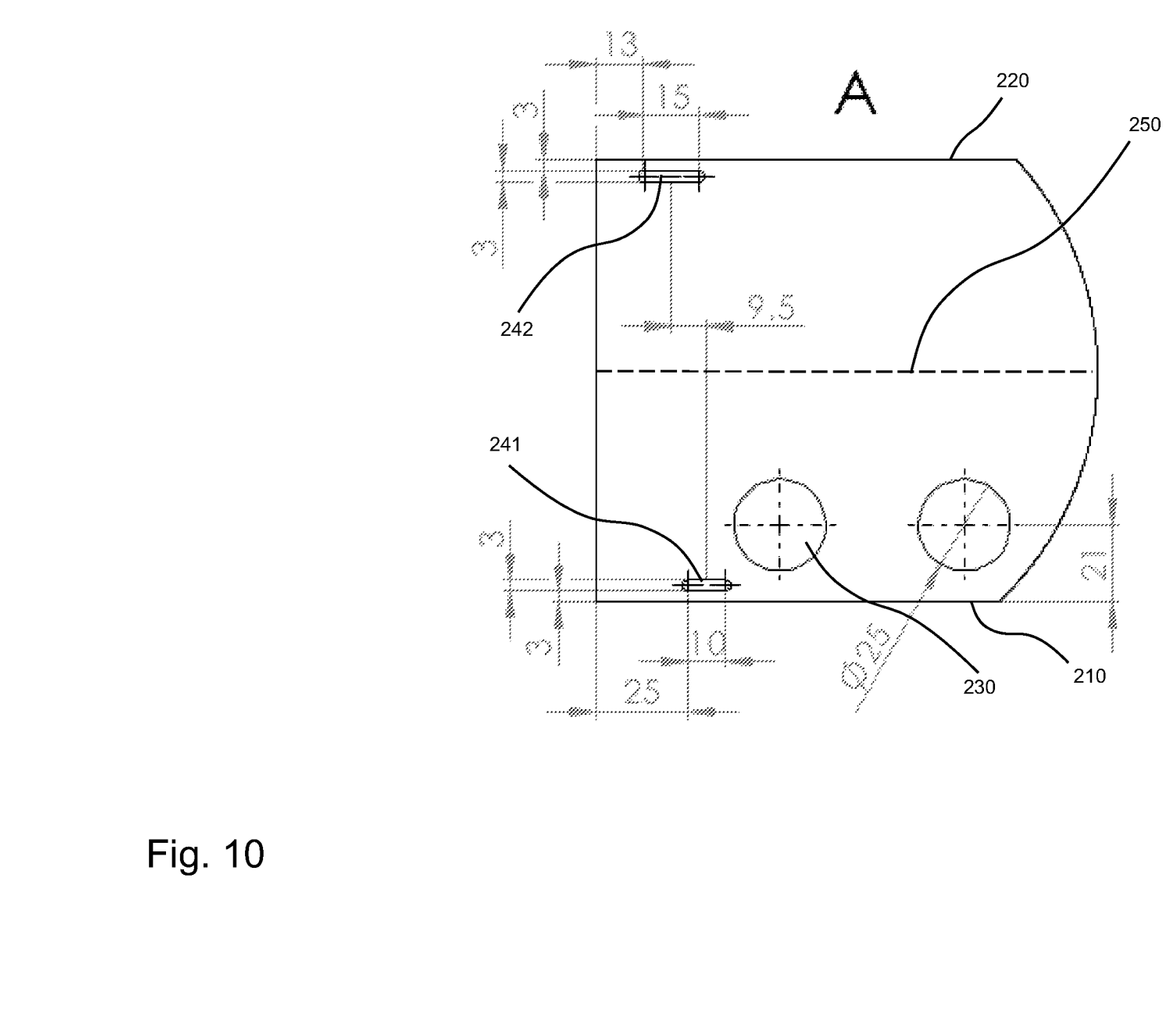
FIG. 10 is a magnified section pursuant to Detail A of FIG. 6.

The second connection elements 240 are configured as connection openings and, furthermore, form connection element pairs 241, 242, wherein, respectively, one pair 241, 242 of second connection elements 240 of the first and of the second longitudinal edges 210, 220 is arranged in a slightly offset manner, opposite to each other along the extension direction of the longitudinal edges 210, 220. As can be seen in FIG. 10, in particular, the connection opening 241 is shorter than the connection opening 242, wherein, in the longitudinal direction of the attachment 2, the connection openings 241, 242 are slightly overlapping.

If FIGS. 1 to 5, which show the base carrier 1, and FIGS. 6 to 10, which show the attachment 2, are considered together, it will become evident that the pairs of first and second connection elements 140, 240 are arranged and configured in such a way that, in assembled condition, a protrusion 141 of the base carrier 1 interlocks with a connection opening 241 of an attachment 2 and a protrusion 142 of the base carrier 1 interlocks with a connection opening 242 of an attachment 2 in the form of a detachable snap-on or locking connection. Thus, various advantages can be realized. First of all, a multitude of base carriers 1, stacked onto each other, and another multitude of attachments 2, stacked onto each other preferably in unfolded condition can be transported to the place of installation in a space-saving and, therefore, cost efficient manner. On-site, several base carriers 1 can be arranged with their longitudinal edges 163, 164 or respectively with their transverse edges 161, 162 adjoining in order to obtain the preferred base area of a filter element. Then, a corresponding number of attachments 2 are arranged on this plurality of base carriers 1, arranged adjacently in transverse or longitudinal direction. To this end, each attachment 2 is folded along its fold line 250 and then attached with the connection openings 241, 242 to the protrusions 141, 142 of adjacent second folding edges 120 of the base carrier 1. The fold line 250 of an attachment 2 preferably extends parallel to the first folding edge 110 of the base carrier 1, which is located between the adjacent second folding edges 120, with which the connection openings 241, 242 are interlocked through their interlocking with the respective protrusions 141, 142. Thus, the multitude of attachments 2 is attached to the base carrier 1 in such a way that the connection openings 241 of a first longitudinal edge 210 of a first attachment 2 and the second connection openings 242 of the longitudinal edge 220 of a second attachment respectively interlock with the protrusions 141, 142 of a single, shared second folding edge 120 of the base carrier.

Since, due to their longitudinal extension, the attachments 2 extend over several base carriers 1, which are consecutively arranged along their first and second folding edge 110, 120, wherein they touch each other with their respective transversal edges 161, 162, a connection between the several base carriers 1 is also established through the detachable locking or snap-on connection between the second connection elements 240 and the first connection elements 140.

Since, at the longitudinal edges 163, 164 of the base carriers 1, the second folding edges 120 are configured in sections, a connection between two base carriers 1, which are touching at their longitudinal edges 163, 164, is also created in the direction transversal to the extension of the first and second folding edges 110, 120 of the base carriers 1 through the interlocking of the first and the second connection elements 140, 240.

Thus, the size of the filter elements can be adjusted through the selection of the respective number of base carriers 1 and attachments 2. Furthermore, individual base carriers 1 and/or individual attachments 2 can be replaced if need be, for example due to damage.

Furthermore, the detachable snap-on or respectively locking connection between the base carriers 1 and the attachments 2 allows for a robust connection that ensures a reliable connection between base carriers 1 and attachments 2 even in the case of long-term use with repeated cleaning processes.

It is to be understood that variations and modifications can be made on the aforementioned structure and method without departing from the concepts of the present invention, and further it is to be understood that such concepts are intended to be covered by the following claims unless these claims by their language expressly state otherwise.

The invention claimed is:

1. A filter element for separating particles from a particle-laden crude gas stream, comprising:
at least one base carrier, configured as a folded plate with several first folding edges and several second folding edges, wherein several first passage openings are arranged proximate the first folding edges and several first connection elements are arranged proximate the second folding edges; and
a plurality of attachments, wherein each of the attachments is configured as a separate strip foldable in a longitudinal direction along a fold line with several second passage openings and a first and a second longitudinal edge, and wherein each attachment comprises second connection elements proximate the first and the second longitudinal edge;
wherein the attachments are respectively folded along their fold line and arranged on the base carrier wherein the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier.

2. The filter element in accordance with claim 1, wherein the base carrier is designed as an injection molded part and wherein the attachments are designed as extruded parts.

3. The filter element in accordance with claim 1, wherein the base carrier and the attachments are comprised of plastic.

4. The filter element in accordance with claim 1, wherein the at least one base carrier comprises two opposing longitudinal edges extending parallel to the folding edges, wherein both longitudinal edges respectively form sections of second folding edges.

5. The filter element in accordance with claim 4, wherein the sections of the second folding edge of the first longitudinal edge and the sections of the second folding edge of the second longitudinal edge are free of overlaps in the direction of the folding edges.

6. The filter element in accordance with claim 4, wherein the sections of one longitudinal edge of a first base carrier form a shared second folding edge with the sections of the other longitudinal edge of a second, adjacent base carrier.

7. The filter element in accordance with claim 1, wherein the second passage openings are arranged between the respective first longitudinal edge and the respective fold line of the attachments.

8. The filter element in accordance with claim 1, wherein the second passage openings are arranged between the respective second longitudinal edge and the respective fold line of the attachments.

9. A filter element for separating particles from a particle-laden crude gas stream, comprising:
at least one base carrier, configured as a folded plate with several first folding edges and several second folding edges, wherein several first passage openings are arranged proximate the first folding edges and several first connection elements are arranged proximate the second folding edges; and
a plurality of attachments, wherein each of the attachments is configured as a strip foldable in a longitudinal direction along a fold line with several second passage openings and a first and a second longitudinal edge, and wherein each attachment comprises second connection elements proximate the first and the second longitudinal edge;
wherein the attachments are respectively folded along their fold line and arranged on the base carrier wherein the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier, and wherein the attachments have a longitudinal extension corresponding to a multiple of an extension of the at least one base carrier in the direction of its first and second folding edges.

10. The filter element of claim 9, wherein the multiple is an integer.

11. A filter element for separating particles from a particle-laden crude gas stream, comprising:
at least one base carrier, configured as a folded plate with several first folding edges and several second folding edges, wherein several first passage openings are arranged proximate the first folding edges and several first connection elements are arranged proximate the second folding edges; and
a plurality of attachments, wherein each of the attachments is configured as a strip foldable in a longitudinal direction along a fold line with several second passage openings and a first and a second longitudinal edge, and wherein each attachment comprises second connection elements proximate the first and the second longitudinal edge;
wherein the attachments are respectively folded along their fold line and arranged on the base carrier wherein the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier, and wherein the connection between the first and the second connection elements is configured as a detachable connection.

12. A filter element for separating particles from a particle-laden crude gas stream, comprising:
at least one base carrier, configured as a folded plate with several first folding edges and several second folding edges, wherein several first passage openings are arranged proximate the first folding edges and several first connection elements are arranged proximate the second folding edges; and
a plurality of attachments, wherein each of the attachments is configured as a strip foldable in a longitudinal direction along a fold line with several second passage openings and a first and a second longitudinal edge, and wherein each attachment comprises second connection elements proximate the first and the second longitudinal edge;
wherein the attachments are respectively folded along their fold line and arranged on the base carrier wherein the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier, and
wherein the first connection elements are configured as connection element pairs, wherein respectively one pair of first connection elements is arranged in a slightly offset manner, opposite to each other, in the area of one of the second folding edges; and
the second connection elements are configured as connection element pairs, wherein respectively one pair of second connection elements of the first and the second longitudinal edges is arranged in a slightly offset manner, opposite to each other.

13. The filter element in accordance with claim 12, wherein the one pair of first connection elements and the one pair of second connection elements of the first and second longitudinal edges are arranged along the extension direction of the second folding edges and longitudinal edges, respectively.

14. A base carrier for a filter element for separating particles from a particle-laden crude gas stream, wherein the base carrier is configured as a folded plate with several first folding edges and several second folding edges, wherein several first passage openings are arranged proximate the first folding edges and several first connection elements are arranged proximate the second folding edges, and a plurality of discrete attachments each configured as a strip foldable in a longitudinal direction along a fold line with several second passage openings and a first and a second longitudinal edge, and wherein each of the attachments comprise second connection elements proximate the first and the second longitudinal edge.

15. A method for assembling a filter element for separating particles from a particle-laden crude gas stream, the method comprising the steps of:

providing at least one base carrier, configured as a folded plate with several first folding edges and several second folding edges, wherein the several first passage openings are arranged proximate the first folding edges and several first connection elements are arranged proximate of the second folding edges;

providing a plurality of attachments, wherein each of the attachments is configured as a separate strip foldable in a longitudinal direction along a fold line with several second passage openings and a first and a second longitudinal edge, and wherein each attachment comprises second connection elements proximate the first and the second longitudinal edge;

folding the attachments, respectively along their fold lines; and arranging the attachments on the base carrier in such a way that the second connection elements of the first and the second longitudinal edges of each attachment are connected with the first connection elements of two adjacent second folding edges, and the second connection elements of the first longitudinal edge of one of the attachments and the second connection elements of the second longitudinal edge of an adjacent attachment are connected with the first connection elements of one of the second folding edges of the base carrier.

16. A method for producing a base carrier and an attachment for a filter element for separating particles from a particle-laden crude gas stream, the method comprising:

injection molding a base carrier configured as a folded plate with several first folding edges and several second folding edges, wherein several first passage openings are arranged proximate the first folding edges and several first connection elements are arranged proximate the second folding edges; and extruding a plurality of attachments, wherein the attachments are each configured as a separate strip foldable in a longitudinal direction along a fold line with several second passage openings and a first and a second longitudinal edge, and wherein the attachments comprise second connection elements proximate the first and the second longitudinal edge.

17. The method in accordance with claim 16, wherein the fold line extends in the extrusion direction.

18. The method in accordance with claim 16, wherein the fold line extends transversely to the extrusion direction.

19. The method in accordance with claim 16, wherein a formability of the fold line of the attachment is achieved through a section-by-section reduction of the wall thickness by means of a chipless forming process.

* * * * *